(12) United States Patent
Chheda et al.

(10) Patent No.: US 8,266,050 B2
(45) Date of Patent: Sep. 11, 2012

(54) SYSTEM AND METHOD FOR PROCESSING LOANS

(75) Inventors: Mayur Dhanji Chheda, Charlotte, NC (US); Thomas Steven Helock, Orange Park, FL (US); Scott Christopher Arcure, Chapel Hill, NC (US)

(73) Assignee: Bank of America Corporation, Charlotte, NC (US)

( * ) Notice: Subject to any disclaimer, the term of this patent is extended or adjusted under 35 U.S.C. 154(b) by 357 days.

(21) Appl. No.: 11/668,712

(22) Filed: Jan. 30, 2007

(65) Prior Publication Data

US 2008/0183515 A1 Jul. 31, 2008

(51) Int. Cl.
*G06Q 40/00* (2012.01)
(52) U.S. Cl. ......................................................... 705/38
(58) Field of Classification Search .................... 705/35, 705/38, 45
See application file for complete search history.

(56) References Cited

U.S. PATENT DOCUMENTS

| | | | | | |
|---|---|---|---|---|---|
| 5,870,721 | A | * | 2/1999 | Norris | 705/38 |
| 5,890,140 | A | * | 3/1999 | Clark et al. | 705/35 |
| 5,940,812 | A | * | 8/1999 | Tengel et al. | 705/38 |
| 6,772,131 | B1 | * | 8/2004 | Francis et al. | 705/35 |
| 7,310,618 | B2 | * | 12/2007 | Libman | 705/38 |
| 7,356,506 | B2 | * | 4/2008 | Watson et al. | 705/39 |
| 2001/0037274 | A1 | * | 11/2001 | Monticciolo | 705/35 |
| 2002/0152155 | A1 | * | 10/2002 | Greenwood et al. | 705/38 |
| 2003/0018558 | A1 | * | 1/2003 | Heffner et al. | 705/37 |
| 2003/0033242 | A1 | * | 2/2003 | Lynch et al. | 705/38 |
| 2003/0093366 | A1 | * | 5/2003 | Halper et al. | 705/38 |
| 2004/0030649 | A1 | * | 2/2004 | Nelson et al. | 705/44 |
| 2004/0133876 | A1 | | 7/2004 | Sproule | |
| 2004/0225584 | A1 | | 11/2004 | Quinn et al. | |
| 2005/0010506 | A1 | * | 1/2005 | Bachann | 705/35 |
| 2005/0102225 | A1 | * | 5/2005 | Oppenheimer et al. | 705/38 |
| 2005/0137968 | A1 | * | 6/2005 | Mitchell | 705/38 |
| 2007/0050289 | A1 | * | 3/2007 | Zeller et al. | 705/38 |

OTHER PUBLICATIONS

Kropper, Steve. "Made in India". Mortgage Banking. Washington: Jun. 2005. vol. 65, Iss. 9; p. 40 (7 pages).*
Dictionary of Finance and Investment Terms. 6th ed. Barron's Educational Series Inc. 2003 (3 pages).*
Kropper, Steve. Made in India. Mortgage Banking: Jun. 2005; 65, 9, p. 40 (7 pages).*
Story, Brenda. "Hotline—In some situations, an SSN is required :[All Edition]." Journal Star Jan. 11, 2005 (2 pages).*

(Continued)

*Primary Examiner* — Elda Milef
(74) *Attorney, Agent, or Firm* — Michael A. Springs; Moore and Van Allen, PLLC; Ryan P. Harris

(57) ABSTRACT

Loan requests may be automatically processed for approval and fulfillment by a distributed processing system. The processing system receives loan requests and determines whether the loan should be approved and, if needed, request supplemental loan information from vendor systems. The processing system may further perform due diligence, generate closing documents and board loans. Exceptions may be detected and handled manually if necessary; once work on exceptions are complete, the remainder of loan processing may be completed automatically. In some configurations, a loan request or tasks thereof may be transferred from a processing system at a first processing center to a second processing center to continue processing in response to a predefined event. The first and second processing centers may be located in different time zones. Additionally, the processing system may provide a simulation environment for evaluating process models prior to implementation in a live processing environment.

26 Claims, 9 Drawing Sheets

OTHER PUBLICATIONS

Dutta, Sunil. "Identity theft." The World & I 18.10 (2003): 291. (6 pages).*

Richards, Norine. "Vendor Due Diligence: Eight Steps to Manage Risk." Credit Union Magazine Nov. 1, 2006 (3 pages).*

Take a Holistic Approach to Your ECM Solution. AIIM E-Doc Magazine : The AIIM Guide to ECM Purchasing 2007 Jan. 1, 2006.(2 pages).*

Mueller, Mark. "Inside Ameriquest." Orange County Business Journal May 22, 2006 (2 pages).*

Garner, Alan C. "Offshoring in the Service Sector: Economic Impact and Policy Issues." Economic Review—Federal Reserve Bank of Kansas City 89.3 (2004): 5-37 (33 pages).*

Silver, Bruce, "Driving Agility and Performance with BPM and Business Rules", Industry Trend Reports, Sep. 2005, 17 pages, Bruce Silver Associates, Publisher.

Hines, Patricia, "Commercial Loan Origination: Vendors Deliver on the Promise of Straight-Through Processing", Dec. 2006, 16 pages, The Tower Group, Publisher.

International Search Report and Written Opinion for International Application No. PCT/US08/52455, mailed Nov. 6, 2008, 8 pages.

International Preliminary Report on Patentability for International Application No. PCT/US2008/052455 mailed Aug. 4, 2009, 5 pages.

* cited by examiner

SYSTEM AND METHOD FOR PROCESSING LOANS

BACKGROUND

The use of loans has become a significant part of the global economy for individuals and businesses alike. Not only do loans offer individuals and businesses a source of cash flow that they would not otherwise have, they also provide a profit source for lenders. In general, applications for loans are scrutinized on a variety of different levels to determine the level of risk involved in lending a requested amount of money to the applicant. Once approved, a loan request must then undergo a fulfillment process that may require significant amounts of time. Applicants, however, generally want to obtain a loan quickly and painlessly. As such, applicants will often choose a lender based on the speed with which their applications will be processed and, if approved, the speed with which their loans will be fulfilled.

Current methods and systems of loan approval and loan fulfillment involve highly manual and segmented processes. For example, loan applications may be reviewed and analyzed by multiple departments before a decision is made regarding approval. A similarly segmented process may be used for fulfilling a loan request. Each department may require a day or more to review the loan application, obtain any necessary supplemental information, and formulate a decision. Furthermore, if a department initiates the processing of a loan request but fails to complete the processing prior to a closing time, the processing may be delayed until the next business day (e.g., due to the loan processing specialists or employees retiring for the day). As such, the processing of loan requests may be delayed for substantial amounts of time, potentially creating frustration and dissatisfaction in applicants.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An automated method and system for loan processing allows for streamlined and efficient processing of loan requests. The automated method and system may break the process down into multiple tasks and coordinate the performance of each according to one or more loan and/or institution policies. In one example, a loan request may be received by a processing system that automates the acquisition of supplemental loan request information and automatically formulates a decision based on the loan request information and supplemental loan request information. Additionally, if an exception is detected in the loan request, the request may be sent to an exception handler for manual processing. Exceptions may be defined by a loan processing policy instituted by the lender. For example, an exception may be defined as any loan request that provides real estate as collateral and requires physical inspection of the property. Additional or alternative exceptions may be defined based on a variety of factors. Upon determining that a loan request is approved, the loan request may then automatically be submitted to a loan fulfillment process. Loan fulfillment may include the automated retrieval and review of due diligence information, automatic generation of loan closing documents, and the automatic boarding and booking of loans. The processing system may coordinate the completion of each of these processes while monitoring for potential exceptions that may need manual review and analysis. Loan closing documents may further be electronically transmitted to an applicant for his or her signature. Once executed, the loan closing documents may be submitted back to the processing system for boarding and booking of the loan.

Additionally, a rules engine may be used to coordinate the order in which process steps are performed. For example, the rules engine may define the sequence in which various tasks may be performed by the processing system. As such, the amount of manual management or processing may be significantly reduced and loan processing substantially streamlined.

According to one or more aspects, a distributed network of processing centers may be established to process loan requests during a larger window of time. A processing center may include automated processing systems such as computers and servers, personnel such as bank employees or loan processing specialists and/or combinations thereof. In one arrangement, a first processing center in the network may begin processing a loan request. At a predetermined time (e.g., shift completion time of loan processing personnel, shutdown, maintenance, and/or closing time of the center) or when a particular event is detected (e.g., an exception or a different task needs to be completed), the first processing center may determine that assistance is required from another processing center. In response, the first processing center may identify an available and appropriate second processing center to perform one or more processing tasks. For example, if the first processing center encounters a due diligence exception, the first processing center may identify another processing center that deals with due diligence exceptions. The identification and selection of a second processing center may also involve considerations of the hours of operation of the second processing center. The first processing center may then submit the loan request or a processing task associated therewith to the identified second processing center to continue the request processing. The first processing center may also transmit processing status information along with the loan request. The status information may be used to identify a stage at which processing was discontinued by the first processing center. The second processing center may take over one or more processing tasks including communications with the applicant, if needed. Additionally or alternatively, the first processing center and the second processing center may be located in different time zones. As such, even when the first processing center shuts down or closes for the day, the second processing center may still be active and continue processing the loan request. Further, the loan request may be transmitted to a third processing center if the second processing center shuts down, closes and/or is unable to handle a particular processing task while the request is still being processed. A distributed processing network may further allow applicants to apply for, access and otherwise interact with loans and loan requests through banking centers, automated teller machines (ATMs), kiosks, web portals, handheld devices, wireless devices, phone, email, web chat, client managed channels and the like.

According to yet another aspect, processing of a loan through a distributed processing network may be coordinated and/or monitored by a master processing system. The master processing system may perform tasks such as dividing the processing of a loan request into multiple tasks and assigning each task to an appropriate processing system or center. In selecting an appropriate processing system or center for performing the various tasks, the master processing system may evaluate time zone information associated with each processing system or center and the capabilities of a system or center. In one example, the master processing system may assign a due diligence task to a first processing system or center. Once the first processing system or center finishes the due diligence task, the master processing system may then instruct a second processing system or center to perform a loan boarding task. Tasks may be performed automatically using automated processing systems, manually by loan processing personnel or combinations thereof.

Furthermore, a loan processing system may track and validate the processing of a loan as the processing occurs. As such, the loan processing system may validate a loan request approval against an institution or loan policy instituted by the lending institution. If changes in policies are made, the changes may be implemented even while loans are being processed. For example, new policies may be integrated into the processing system during run-time. Additionally, a loan processing system may provide real-time data (e.g., loan processing status) to an applicant.

In yet another aspect, a processing system may interface with one or more external vendor systems and/or internal legacy systems for processing a loan request. External vendor systems may include due diligence information systems and credit reporting agencies. Internal legacy systems, on the other hand, may include risk analysis applications, document generation systems and loan boarding and booking applications. The processing system may automatically interface with one or more of the systems in response to determining that a process calls for services provided by the one or more systems.

In a further aspect, a processing system may simulate an operating environment for testing and evaluating new process models and processes. In particular, a processing system may use real-time process data to design new processes and create new models within the processing system. The system may also be used to provide a simulation environment, wherein new processes and models may be evaluated and validated using real-time data prior to implementation in live processing systems. Once the new processes or models have been tested in the simulation environment, the processing system may deploy the new processes and models dynamically into the loan processing workflow at run time. In one example, a processing system may be used to test a new product or a new process in the simulation environment and to examine the output results produced using captured real-time data. If simulation results are satisfactory or meet approval, the processing system may dynamically deploy the new product or process into the workflow at run time without the need for programming code changes.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
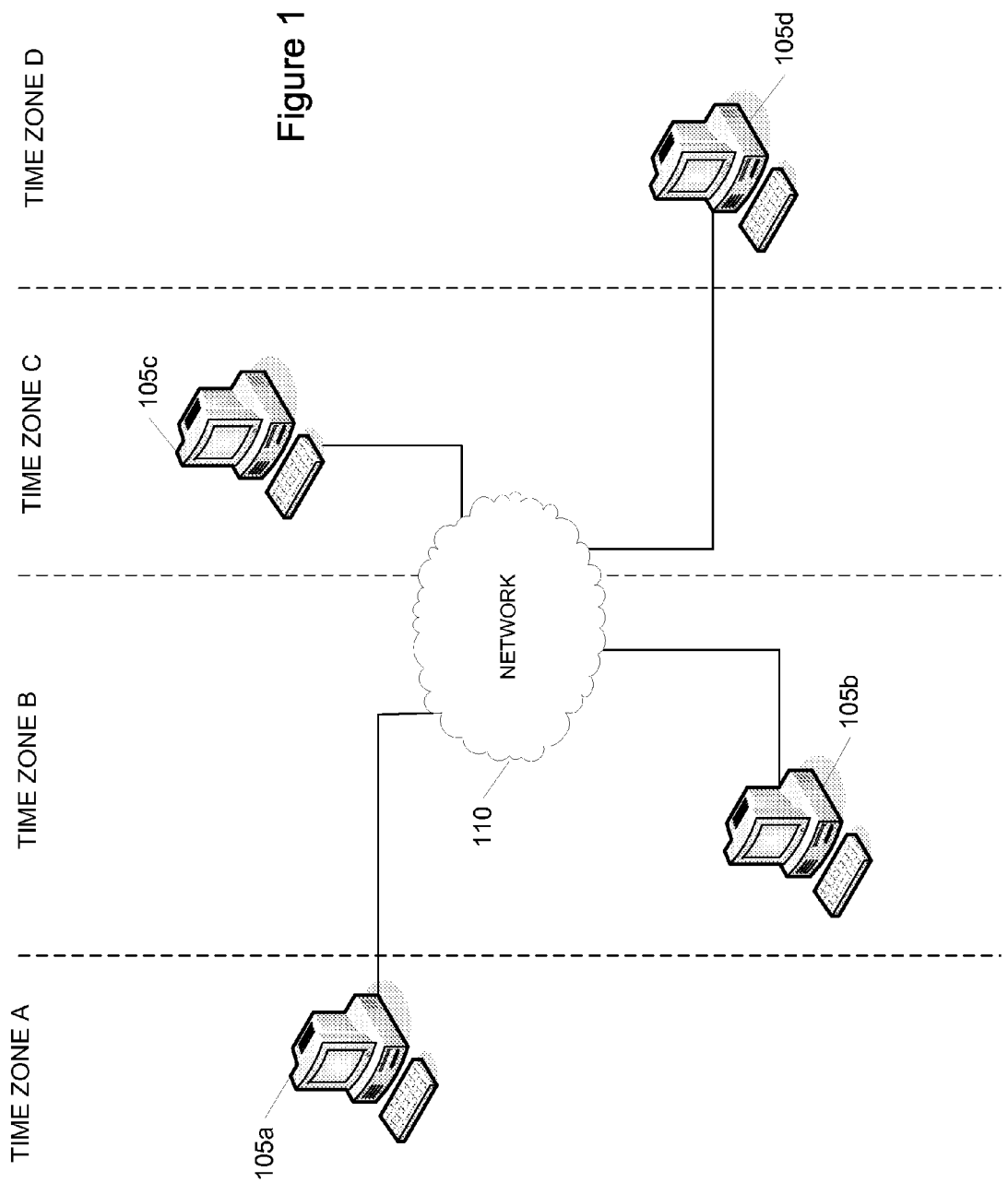
FIG. 1 illustrates a loan processing network according to one or more aspects described herein.

FIG. 1 illustrates a loan processing network, which includes multiple loan processing centers 105 for approving and fulfilling loan requests. Loan processing centers 105 may include automated loan processing systems and/or loan processing personnel. Loan processing systems may comprise devices such as personal computers (PCs), servers, mobile computing devices (e.g., personal data assistants and/or laptop computers) and the like. Loan processing centers 105 may further be connected to one another through communications network 110 (e.g., via an automated loan processing system). Network 110 may include a variety of network types, including the Internet. Additionally, loan processing center 105 may connect to network 110 in various ways, including wired and wireless network protocols (e.g., BLUETOOTH, wireless local area network (WLAN)). Security protocols such as secure sockets layer (SSL) and/or transport layer security (TLS) may also be established over network 110 to maintain and insure the security of data transmitted there through. In one example, financial data transmitted from center 105a to center 105b over network 110 may be encrypted so that the data might not be used by an unauthorized third party.

In one or more configurations, loan processing centers 105 may be distributed throughout different time zones. The time zones may be adjacent or non-adjacent time zones. Using a distributed network for processing loan requests allows for a larger time window for processing loans. In one example, if loan processing center 105c closes at 5:00 PM in a first time zone, e.g., Eastern Standard Time (EST), a loan request that is being processed at 5:00 PM may be transferred to loan processing center 105a when center 105c closes. Center 105c may select center 105a based on center 105a being in a time zone behind that of center 105c. As such, center 105a may take over and continue processing of the loan request until a predetermined (e.g., closing) time of center 105a. Thus, if center 105a closes at 5 PM MST, processing of the loan request may continue for an additional 2 hours beyond the closing of center 105c. In another example, center 105a may be in a time zone 12 hours behind that of center 105c. As such, center 105a might only be beginning the business day when center 105c is scheduled to close or shut down. Center 105c may thus maximize the amount of processing time by one center by transferring the loan request to center 105a. Loan requests may be processed within a shorter period of time using such a distributed processing network since there would be no need to wait until a processing center, e.g., center 105c, re-opens before continuing and completing processing of a loan request. For example, a distributed processing network with centers in multiple (or every) time zones throughout the world may thus process loan requests up to 24 hours a day by transmitting the loan request to centers in later time zones as centers in earlier time zones close. For example, a loan request may be initially processed by center 105d. Upon center 105d closing or shutting down, the loan request may be transferred to center 105c in another time zone. If and when center 105c shuts down, the loan request may again be transferred, this time to center 105b. The loan request may continue to be transferred systematically to other centers in response to closing or shutting down of a current processing center until processing of the loan request is completed. Accordingly, in one example, personnel at center 105b may pick up where a loan processing specialist at center 105c left off when center 105c closes for the day, without losing significant processing time.

According to one or more aspects, a distributed loan processing network may also be used so that different loan processing tasks may be performed by different processing centers (e.g., centers 105). As such, center 105a, upon receiving a loan request, may assign processing tasks to other centers such as centers 105b and 105c that are capable of performing tasks like retrieval of request decision information and boarding of loans. In one example, an exception detected by center 105a may be transferred to a center, e.g., center 105d, which has personnel with the appropriate skills and knowledge to handle and resolve the exception. Alternatively or additionally, loan tasks may be created and delegated by a master processing system (not shown) networked with each of centers 105. Thus, upon receiving a loan request, the master processing system may divide the request into one or more processing tasks and delegate the tasks to appropriate processing centers (e.g., centers 105) based on capability and processing load. For example, processing center capabilities may be based on the skills and knowledge of bank personnel located at the center. In one or more arrangements, the processing system of the processing center at which a loan request was initially received may be designated as the master processing system for that particular loan request.

Figure 2:
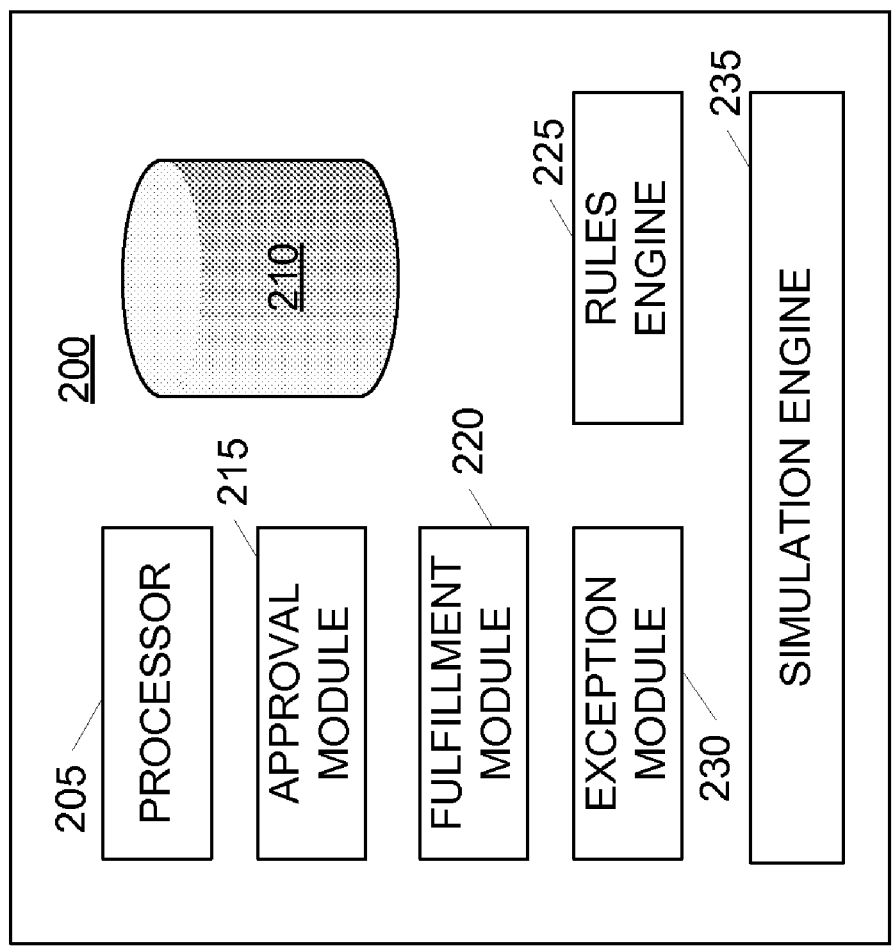
FIG. 2 illustrates a processing system in which one or more aspects described herein may be implemented.

FIG. 2 illustrates exemplary components of an automated loan processing system (e.g., used in loan processing center 105a of FIG. 1) for approving and fulfilling loan requests. Processing system 200 may include processor 205, database 210, loan approval module 215, loan fulfillment module 220, rules engine 225 and exception module 230. Processor 205 may generally be used by each of modules 215, 220 and 230 and engine 225 to perform various tasks and execute various instructions. For example, loan approval module 215 may use processor 205 to calculate the level of risk associated with a particular loan request. Loan approval module 215, on the other hand, may include instructions and rules for evaluating a loan request to determine whether the request should be approved. Loan approval module 215 may further include or be connected to one or more additional systems that may determine and provide supplemental approval decision information such as credit scores, credit histories, income information, length/depth of relationship with the bank, collateral type/valuation, business & risk ratings and the like. The approval decision information may be determined using request information submitted by the loan applicant. Based on the supplemental approval decision information, loan approval module 215 may subsequently determine whether to approve the loan request. In one or more arrangements, loan approval module 215 may access one or more legacy decision applications to make the loan approval determination. Alternatively or additionally, decision information may be requested from one or more information vendors.

Loan fulfillment module 220 may be used by system 200 after a loan request has been approved by loan approval module 215. Fulfillment module 220 may be responsible for conducting due-diligence on information provided by the loan applicant. For example, if a loan applicant offers property as collateral, fulfillment module 220 may determine a market value of that property or obtain an appraisal from an internal or external source. In addition, fulfillment module 220 may generate closing documents for completing the loan. Closing documents may include Truth-in-Lending (TIL) statements, consumer-loan documents, guaranties, security agreements, mortgages or deeds of trust, corporate resolutions, other authorizing documents for business entities and/or a loan agreement detailing the terms of the loan. Fulfillment module 220 may further board the loan (i.e., add the loan to the bank or lender's loan systems of record and update client information, if needed. For example, fulfillment module 220 may board the loan using a boarding application associated with the lender's loan systems of record or loan servicing systems.

Exception module 230 may act as a supplemental system to the loan approval and loan fulfillment modules 215 and 220. That is, exception module 230 may detect events within the loan approval and fulfillment processes and determine whether an exception should be generated. If an exception is generated, exception module 230 may submit the approval and/or fulfillment information for manual evaluation and processing. Exceptions may be defined based on a variety of rules and policies, including risk management policies. According to one or more aspects, rules and policies may be managed by rules engine 225. Exception module 230 may submit approval and/or fulfillment data to engine 225 to determine whether one or more rules apply to the data. Exception module 230 may thus determine whether to generate an exception and submit data for exception processing based on the determination made by engine 225. Once exception processing has been completed, exception module 230 may further act as a router to direct the processed loan request to an appropriate destination. In one or more arrangements, rules engine 225 may further be used to guide a loan request through the approval and fulfillment process. In particular, rules engine 225 may determine and trigger processes in a predefined order. For example, once a loan request has been approved, rules engine 225 may trigger fulfillment processes such as generating closing documents. Furthermore, rules engine 225 may be used to divide processing of a loan request into one or more processing tasks according to a predefined policy as well as to select processing centers to which to delegate those processing tasks.

Database 210 may be used by one or more of modules 215, 220 and 230 and engine 225 to temporarily or permanently store data. For example, credit score and credit history data obtained by loan approval module 215 may be temporarily stored to database 210 while the approval process and/or fulfillment process is pending. In another example, fulfillment module 220 may store generated or received closing documents in database 210 for record-keeping purposes. Database 210 may further include encryption or security protocols to guard against the misappropriation of data. One of skill in the art will appreciate that database 210 may be used for a variety of storage purposes.

In one or more configurations, system 200 may further include a simulation engine 235 that provides an environment for simulating the processing of a loan request using a process model. For example, a new or modified process model may be tested using simulation engine 235 prior to implementation in the live process coordinated by rules engine 225. Simulation engine 235 may operate simultaneously with and/or independently of rules engine 225. As such, a loan request may be processed live by rules engine 225 simultaneously with a simulated processing by simulation engine 235.

Additionally or alternatively, processing system 200 may be used as a master processing system in a distributed processing network such as the network illustrated in FIG. 1. That is, processing system 200 may receive loan requests, determine tasks that need to be completed with respect to the request and delegate those tasks to one or more processing centers (e.g., centers 105 of FIG. 1). As such, due diligence may be delegated to a first processing center while loan boarding may be delegated to a second processing center. Delegation of tasks may be based on capabilities and processing load of available processing centers.

Furthermore, the components of system 200 may comprise hardware, software or a combination thereof. Further, one or more of the components may be combined into a single component. Components may also be distributed across local and remote systems and accessed via a data network.

Figure 3:
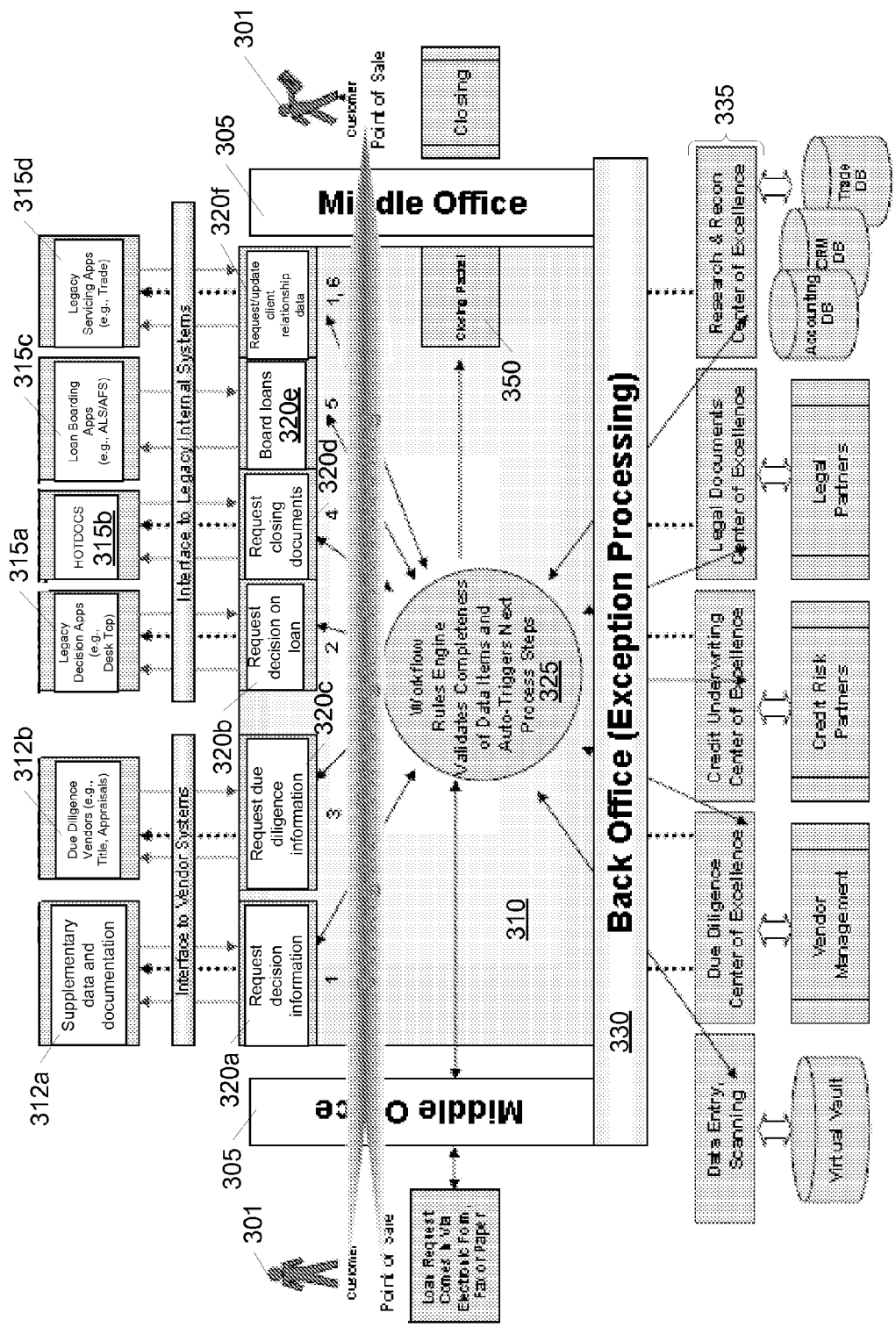
FIG. 3 illustrates a block diagram of a loan approval and fulfillment process flow according to one or more aspects described herein.

FIG. 3 illustrates a process flow for approving and fulfilling loan requests. Initially, applicant 301 may enter a point of sale such as a bank to apply for a loan. Applicant 301 may be an individual, a corporation or some other type of organization. Applicant/customer 301 may apply for the loan via paper, through electronic systems (e.g., computers) and/or combinations of the two (e.g., fax). A loan request may include various information about the applicant including name, tax identification number, current assets, current debt, references and the like. Furthermore, applicant or customer 301 may specify a loan amount for which the applicant wishes to apply. In one or more instances, desired terms may also be specified. Once applicant 301 has completed the loan request, the request may then be transmitted from the point of sale to middle office 305. Middle office 305 may comprise a server, e.g., system 310, that receives and processes loan requests from one or more points of sale. System 310 may include a rules engine 325 that guides the loan request through a series of processes 320. In particular, rules engine 325 may determine a sequence in which process steps or tasks are to be performed. In addition, rules engine 325 may determine task assignments to one or more processing centers. For example, rules engine 325 may specify that upon receiving a loan request, supplemental decision information is to be requested in process 320*a*. Once the supplemental decision information is obtained, rules engine 325 may then call upon a legacy decision application, e.g., app 315*a*, to formulate a decision on the loan. If the loan is the approved, rules engine 325 may then trigger fulfillment processing including due diligence processing in step 320*c* and generation of closing documents in process 320*d* (e.g., using a document generation application such as HOTDOCS 315*b*). Once rules engine 325 determines that the closing documents have been executed, the loan may be boarded in process 320*e* using one or more boarding applications such as application 315*c*. Alternatively or additionally, client relationship data may be updated in process 320*f* using legacy servicing application 315*d*. Client relationship data may include product type, loan type, loan amount, collateral details, internal risk rating, credit/business scores, and the like. Throughout the life of the loan, transactional information such as utilization and payment history may also be captured and stored as client relationship data.

One or more of processes 320 may require interfacing with external vendor systems 312 or one or more internal systems 315. For example, process 320*a* may include a step of requesting decision information such as credit information from external vendor system 312*a*. Another external vendor system may include due diligence vendor 312*b* that provides information such as appraisals and title evaluation data. In another example, process 320*d* may include requesting closing documents from an internal system such as document generation system 315*b*. Other internal systems may include loan decision application 315*a*, loan boarding application 315*c* and loan servicing application 315*d*. Interfaces with external vendor systems such as systems 315 may be established over a data network such as the Internet. Internal systems, on the other hand, may be accessed through an internal network such as a wired or wireless local area network (LAN), wide area network (WAN), virtual private network (VPN) and/or combinations thereof In one or more arrangements, internal applications and systems may be integrated and/or stored on middle office 305 and/or system 310. In addition, interfaces may include security protocols for insuring the integrity and privacy of data transmitted through the interface.

If, in one or more instances, rules engine 325 determines that a data item corresponding to the loan request corresponds to an exception, engine 325 may submit the data item and loan request to back office system 330 for exception processing. Back office system 330 may be integrated into middle office 305 or may be a separate system. Back office system 330 may be responsible for receiving exceptions from rules engine 325 and distributing the exceptions to an appropriate handling center (e.g., one of centers 335). In one or more configurations, an appropriate center may comprise a different loan processing center such as center 105 of FIG. 1. Each of exception handling centers 335 may be staffed by a group of one or more loan specialists or other processing personnel that may resolve the exception detected by engine 325. Each group of one or more loan processing specialists or personnel may be formed based on a specialization or skill. For example, loan processing specialists having an expertise in obtaining appraisals for real estate collateral may be grouped into a first skill and/or exception processing group while loan processing personnel specializing in evaluating credit risk may be grouped into a second skill and/or exception processing group. In one or more instances, exceptions may be escalated from a first exception processing group to a second exception processing group. Escalation may occur if, for example, the first exception processing group does not have a requisite skill level or authority level to resolve the exception. As such, the first exception processing group may pass the exception to a second exception processing group having a higher level of skill, authority or both.

Exception processing may include correcting or completing loan request data and may be handled by one or more automated or manual systems. In one example, if due diligence process 320*c* does not result in sufficient information, rules engine 325 may submit the loan request for due diligence exception processing. In one or more arrangements, rules engine 325 may select a processing center to resolve the exception. Due diligence exception processing may include a manual review of the loan request and further research into the requested due diligence information. This research may involve one or more vendors and may be performed manually, automatically or a combination of manual and automated processes. For example, a loan specialist may contact a vendor directly to determine whether a particular type of due diligence information is available. In another exception handling example, if the loan request is for an amount that exceeds a predefined threshold, engine 325 may submit the request for underwriting exception processing. Underwriting exception processing may involve a manual review of the loan request to determine the level of risk involved with lending the requested amount to the applicant. In view of the amount of the loan request, additional factors may be weighed and analyzed in determining a credit risk. Additionally, credit risk partners may be consulted to verify that the loan is or will be sufficiently underwritten. Other exception processing may involve data entry and scanning, document imaging, legal document creation and validation, and research and reconciliation (e.g., performing research related to accounts and facilities associated with other banks, and reconciliation across multiple internal accounts). Once the exception has been resolved, handling centers 335 may return the loan request to rules engine 325 for further processing.

Once system 310 has approved the loan request and processed the loan fulfillment, closing packet 350 may be transmitted back to the point of sale for applicant 301's review and completion. Closing packet 350 may include a variety of information including a welcome message, loan introductions, payment schedules and copies of the loan documents. According to one or more aspects, once applicant 301 has reviewed and signed the closing documents, the signed documents may be submitted back to system 310 for recordkeeping and for authorizing the execution of the loan.

In one or more arrangements, system 310 may further be networked with one or more other loan processing systems or centers (not shown). These network processing centers and systems may be located across different time zones (and even throughout the world). As such, if system 310 shuts down for some reason (e.g., due to closing of the processing center, maintenance, emergency shutdown), a loan request may be submitted to another processing system or center to continue the processing of the request. In one example, system 310 may transmit a loan request for processing by another system at a center in the same time zone but have a later closing time. In another example, system 310 may transmit the loan request to another processing center in a later time zone. The loan request may continue being transferred to different processing systems and/or centers until the processing of the request has been completed.

Using various aspects of the systems and methods described herein, many aspects of loan processing may be streamlined and automated in a variety of ways. In one example, the loan approval and fulfillment process may be automated to reduce the need for manual and segmented systems. Information needed for approving or disapproving of a loan may be automatically obtained through system interfaces rather than requiring a loan officer or specialist to seek out the information manually. Additionally, automated fulfillment may eliminate the need for manual generation of loan documents and boarding of loans once the documents have been executed. The tasks and processes associated with loan processing may be managed and scheduled by an automated rules engine such as rules engine 225 of FIG. 2. Exceptions may be handled manually using the rules engine to detect such exceptions. One of skill in the art will appreciate a variety of other loan processing tasks may be automated and streamlined in similar fashion.

Furthermore, loan processing may be completed in a shorter amount of time by cutting down on downtime. In particular, processing of loan requests may expand beyond the business hours of a single loan office. A distributed processing method allows loan requests to be transferred to other loan processing systems that are still operating and/or just beginning their hours of operation. The loan request may be systematically transferred from one processing system to another until the request has been completed. As such, a loan request may potentially be processed 24 hours a day.

Figure 4:
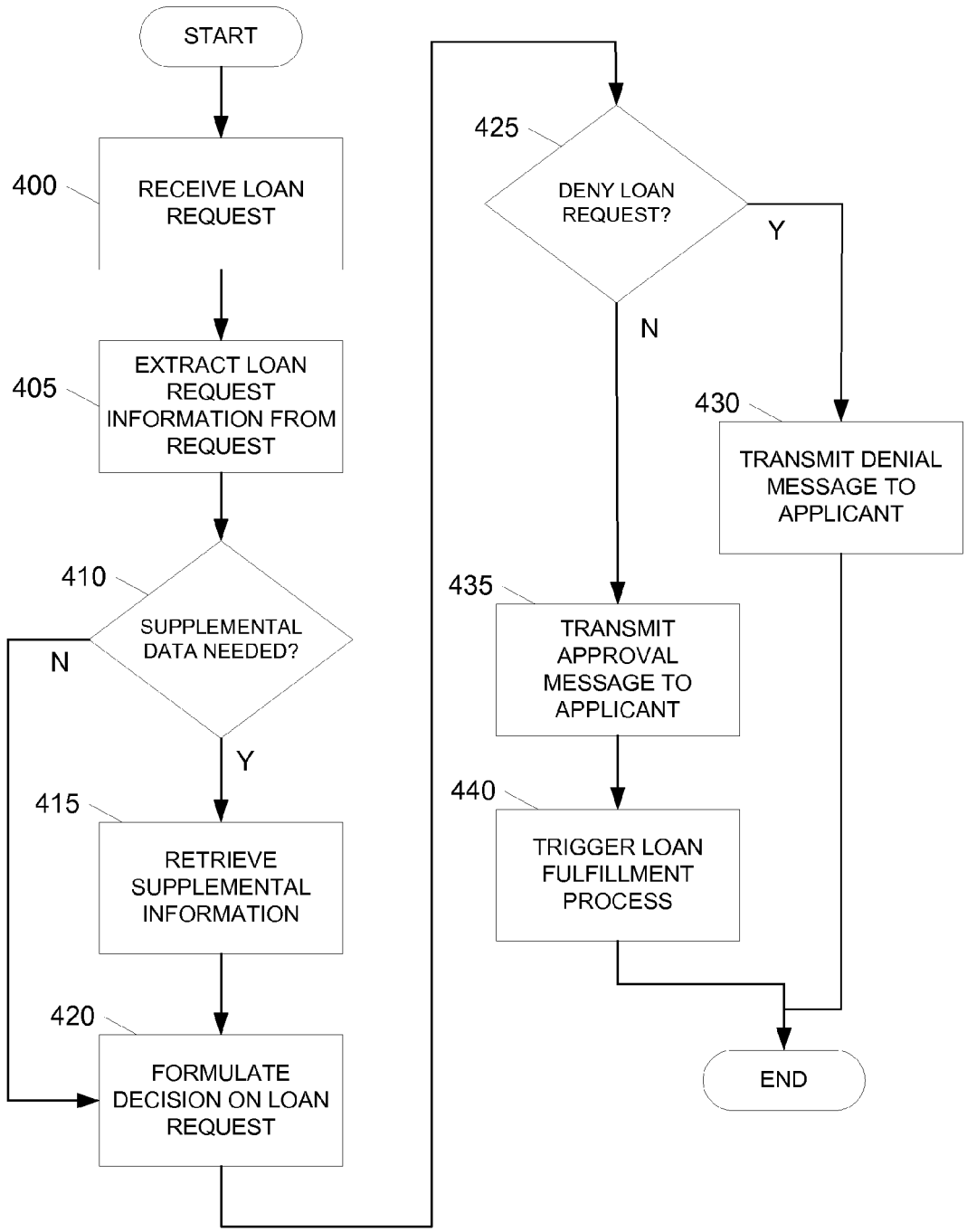
FIG. 4 illustrates an automated loan approval process according to one or more aspects described herein.

FIG. 4 is a flowchart illustrating an automated method for approving a loan request in a distributed processing system. In step 400, a loan processing system may receive a loan request. The loan request may be received from a variety of sources, including points of sale such as a bank, ATM or a local loan office. The loan request may be received electronically (e.g., by fax or e-mail) through a data network. In step 405, loan request information may be automatically extracted from the request in response to receiving the loan request. Loan request information may include applicant's name, taxpayer identification, address, previous residences, references and/or date of birth (for people) or establishment (for companies). The loan request data may be extracted based on a predefined loan request format. That is, loan requests may be formatted according to a predefined structure and thus, data may be extracted and identified based on knowledge of this structure. In one or more arrangements, loan requests may be different for companies or organization than for individual applicants. In such arrangements, different data extraction templates may be applied depending on the type of applicant.

Once loan request information has been extracted by the processing system, a determination may automatically be made by the processing system at step 410 as to whether additional or supplemental loan request information is needed. For example, a credit score may be required for risk evaluation purposes if the requested loan amount exceeds a predefined threshold. In response to determining that additional loan request information is needed, the loan processing system may automatically retrieve the additional information in step 415. The additional information may be retrieved from an internal system or through an external vendor system. Credit scores and histories, for example, may be obtained from external vendors such as EXPERIAN, EQUIFAX or TRANSUNION. Other supplemental information that may be obtained may include asset valuation data and employment history. Upon retrieving the supplemental information, the processing system may automatically formulate a decision on the loan request based on the loan request information and the supplemental loan request information (if needed/retrieved) in step 420. In one example, the decision may be made by the processing system and/or an internal loan decision application based on risk calculation using various applicant and request information, including the requested loan amount and a credit score. If the risk score associated with the request is above a certain predefined threshold, the request may be denied. If however, the risk score is lower than the threshold, the request may be granted.

If the processing system determines that the loan request should be denied in step 425, a denial message may be sent to the applicant and/or point of sale in step 430. Reasons for denial may also be provided to the applicant. If, however, the system determines that the loan request should be approved, the system may transmit an approval message to the applicant and/or point of sale in step 435. Additionally, the system may trigger a loan fulfillment process to complete the loan transaction in step 440. The system may trigger the loan fulfillment process automatically or based on input from the applicant. For example, an applicant, upon receiving the approval message, may be asked whether he or she wishes to complete the loan transaction. As such, the loan fulfillment process (e.g., the loan fulfillment method illustrated in FIG. 5) might only be triggered if the applicant chooses to complete the loan transaction.

In one or more of the above process steps, a determination may be made by the processing system as to whether an exception has occurred. Exceptions may be detected based on predefined exception rules. An exception may be defined as any time a loan requires manual intervention, for example: based on dollar amount of loan, a physical property inspection may be required; title "issues" that need to be researched & cleared; appraisal amount too low for requested loan amount; validation of required lien position. If an exception is detected, the request may be submitted for exception processing. Exception processing may include manual evaluation, correction and/or supplementation of loan request information and analysis. Once exception processing has been completed, processing of the request may proceed at the succeeding step. In one or more examples, exception processing and handling may be optional. Furthermore, exceptions may be escalated to different exception processing groups based on, for example, a level of skill and/or authority needed to resolve the exception.

Figure 5:
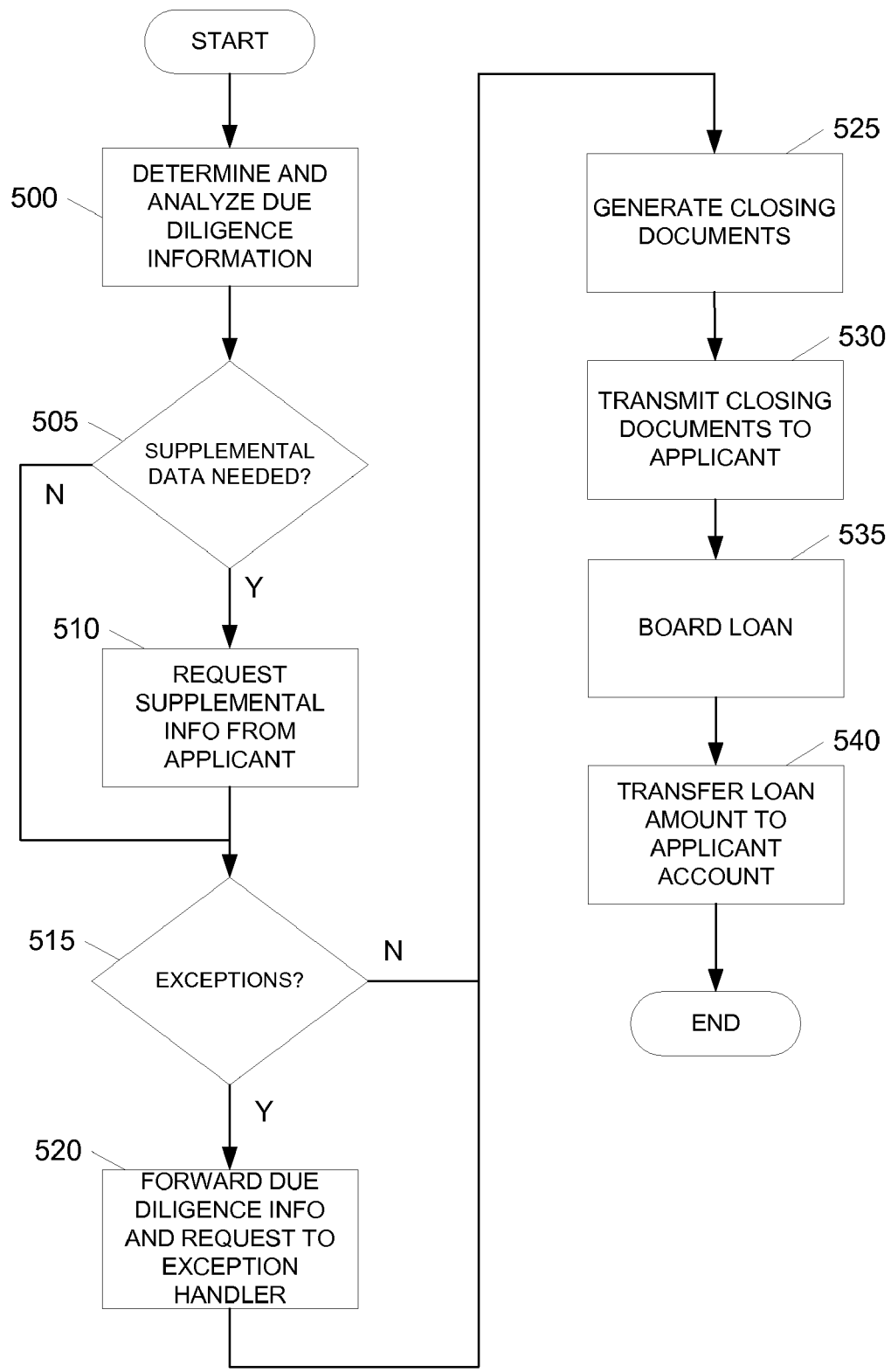
FIG. 5 illustrates an automated loan fulfillment process according to one or more aspects described herein.

FIG. 5 is a flowchart illustrating an automated method for fulfilling a loan request once the request has been approved. Once a request has been approved, the processing system may initiate a fulfillment process that includes a determination and analysis of due-diligence information in step 500. Due-diligence information may be obtained from external vendor systems such as appraisal and title companies. The due diligence information may be used to verify aspects of the loan request and to validate data entered therein. Due diligence information, as used herein, generally refers to three categories of information: (a) verification information to validate, for example, information provided by an applicant (e.g., does the address provided by the applicant match the address obtained from other sources), (b) applicant and guarantor existence and authority information (e.g., good standing certification for a corporation, reviewing trust agreement for a trust, etc.), and (c) collateral information (e.g., value of securities, appraisal of real property, status of title and exceptions to title for real property). In step 505, a determination may be made as to whether additional applicant information is needed. For example, if information is unavailable from a vendor system or if the information is deficient, the processing system may request the information from the applicant in step 510. In step 515, the processing system may determine whether any exceptions have been triggered by the due diligence information and/or information received from the applicant. For example, exception may be triggered when a corporation is determined to not be in good standing, if a trust agreement does not state authority to sign required documents, if exceptions to title report for real property are detected, when an appraisal/property valuation is insufficient, if additional detailed inspections are needed, and/or if securities collateral appears to be restricted or control securities are not readily marketable. If an exception has been triggered, the processing system may submit the due diligence information and loan request to an exception handler for further processing in step 520. The exception handler may perform manual review and analysis of the due diligence information.

Once the exceptions have been resolved or if no exceptions were detected, the processing system may proceed to generating loan closing documents in step 525. The loan closing documents may then be delivered to the applicant in step 530 for execution. The documents may be delivered electronically and the applicant may be allowed to provide an electronic or non-electronic signature. If an applicant provides a non-electronic signature, the signature may be delivered electronically through a variety of electronic transmission methods including fax and e-mail. In one or more arrangements, an electronic signature may be defined as a predefined arrangement of characters such as a person's name entered between two forward slashes (e.g., /Joe Smith/). Additionally or alternatively, electronic signatures may comprise an applicant selecting an agreement option (e.g., an "I agree" checkbox on a website) where the identity of the signing individual may be identified securely and the record of agreement maintained securely. Further, electronic signature captured via electronic signature pads may be utilized when available (e.g., at banking center kiosks, with client managers (sales team) with electronic notepads, etc.). Acceptable electronic signatures may be defined by Federal and/or state laws and regulations. Once the documents have been executed by the applicant, the loan may be boarded by the processing system in step 535. In other words, the loan may be entered into the system for execution and servicing. Additionally, the requested loan amount may be automatically transferred by the system to an account designated by the applicant in step 540. Further, a welcome package may be sent to the applicant including sample questions and answers and other introductory loan information.

Figure 6:
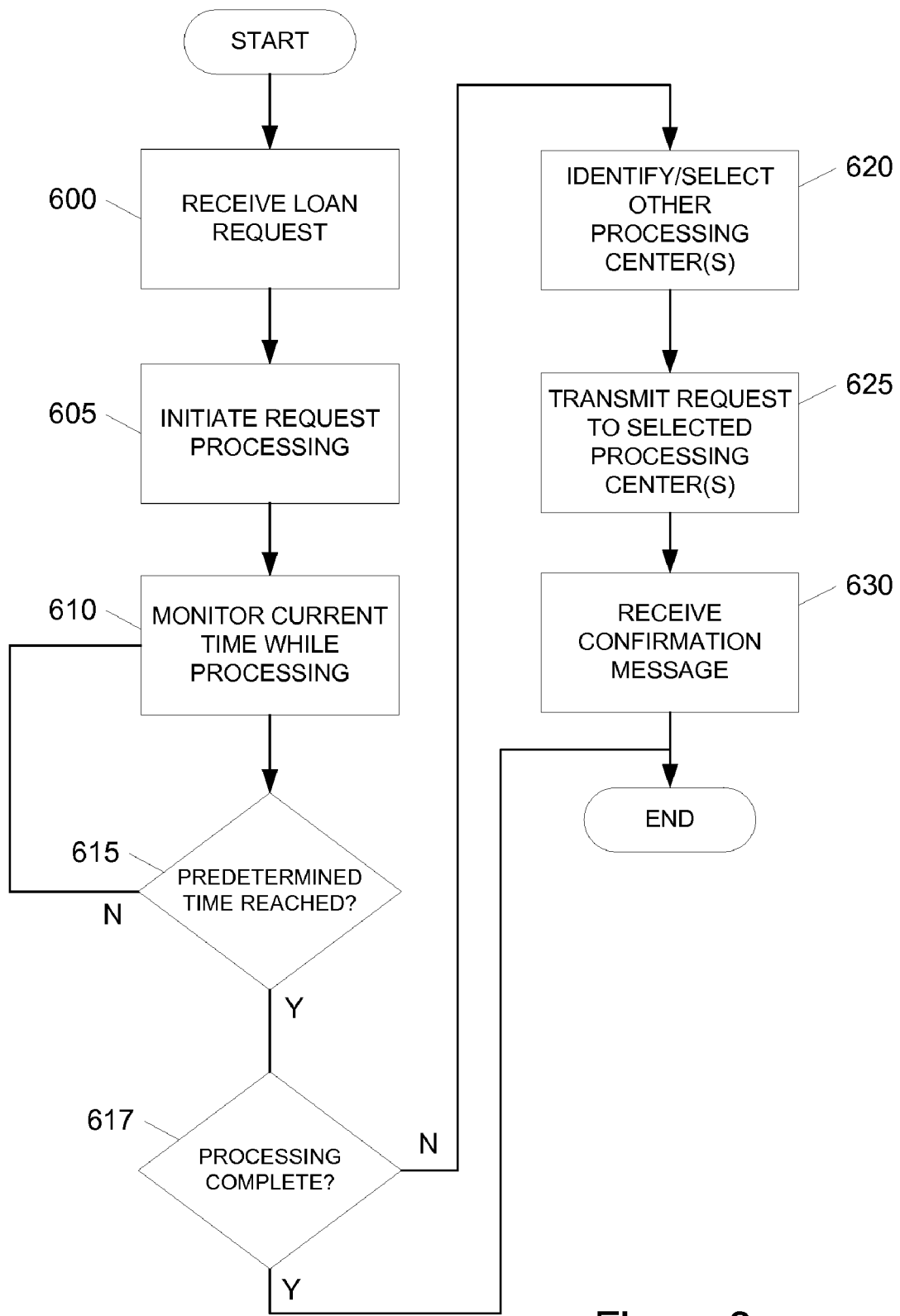
FIG. 6 is a flowchart illustrating a method for processing a loan request in a distributed processing network according to one or more aspects described herein.

FIG. 6 is a flowchart illustrating a method for processing a loan request in a distributed loan processing network. The loan request processing may include one or more loan approval and fulfillment process steps as described in FIGS. 4 and 5, respectively. In step 600, a processing system at an originating processing center may receive a loan request from an applicant. The processing system may initiate processing of the request in step 605. For example, the processing system may begin an approval process (e.g., process of FIG. 4) for evaluating the loan request. During the processing, the system may further monitor the current time at step 610. For example, the system may track a system clock to determine the current time. In step 615, the processing system may determine whether the current time matches a predefined threshold time. The threshold time may be defined based on a variety of factors, including a schedule shift time of loan processing personnel (e.g., work hours of an employee that performs certain processing tasks), closing time of the processing center or system, a scheduled maintenance time and/or an emergency shutdown time of the processing system. In one or more arrangements, the threshold time may be defined as 30 minutes prior to the system's shutdown time. If, in step 615, it is determined that the current time meets the threshold time, the processing system may further determine whether processing of the loan request has been completed in step 617. If processing has not been completed, the processing system may identify and/or select one or more other processing centers or systems that are available to continue the processing of the loan request in step 620. The one or more other processing centers or systems may be identified from a database of processing centers or systems. The database may indicate a shutdown/startup or closing/opening time for each of the processing centers or systems. A processing center or system may be selected based on a variety of factors including processing load, capabilities and hours of operation. In one example, a processing center may be selected to maximize processing time by as few processing centers as possible. Accordingly, a processing center may be selected if the system has just opened or started up for the day. In another example, the original processing center may transfer a loan request to a processing center having the lightest processing load. Processing load may be determined based on automated processing load, manual load of loan processing personnel or a combination thereof. For example, the original processing system may perform load balancing calculations to identify and select an optimal destination processing center or system. In one or more configurations, optimal may be characterized by a combination of available processing time and current processing load. Additionally or alternatively, a processing center's capabilities may be evaluated to determine whether a particular center is able to perform a current task associated with processing the loan request. Capabilities may be determined based on the skills and capabilities of personnel at the center and/or capabilities and availability of automated systems. In one or more arrangements, the considerations for selecting a processing center may be prioritized. For example, capabilities may be weighed the most followed by processing load/availability.

In step 625, the loan request may be transmitted to the selected processing center or system thereof. Along with the loan request, information corresponding to a processing status of the request may also be transmitted. The processing status may specify, e.g., the stage at which processing ended at the previous processing system and/or whether the request was approved. Processing status information may be used so that processing steps are not duplicated between two systems. The original processing system and/or center may further receive a message from the destination processing center or system confirming receipt of the loan request and associated information in step 630. Once the loan request has been transferred, the second processing center may communicate directly with the loan applicant or may communicate with the applicant through the first processing center or system (if active/open). Additionally, when the second processing center completes processing of the loan request, the second center may issue a notification to the first processing center or system of the completion. In addition, the second processing center may board the loan and/or other loan information to a central loan servicing or management system accessible by all processing centers and systems in the distributed network.

While the method illustrated in FIG. 6 is directed to transferring loan processing to a different processing center in response to a particular time, other events may also be used to trigger the transfer of loan processing. For example, other events may include loan processing exceptions (e.g., a task that requires manual review and/or a task that cannot be handled by the present processing system or center) and events defined by a loan processing policy. Accordingly, one of skill in the art will appreciate that the transfer of loan processing to a different processing center may be triggered by detection of a variety of events and is not limited to the detection of a predefined time.

Figure 7:
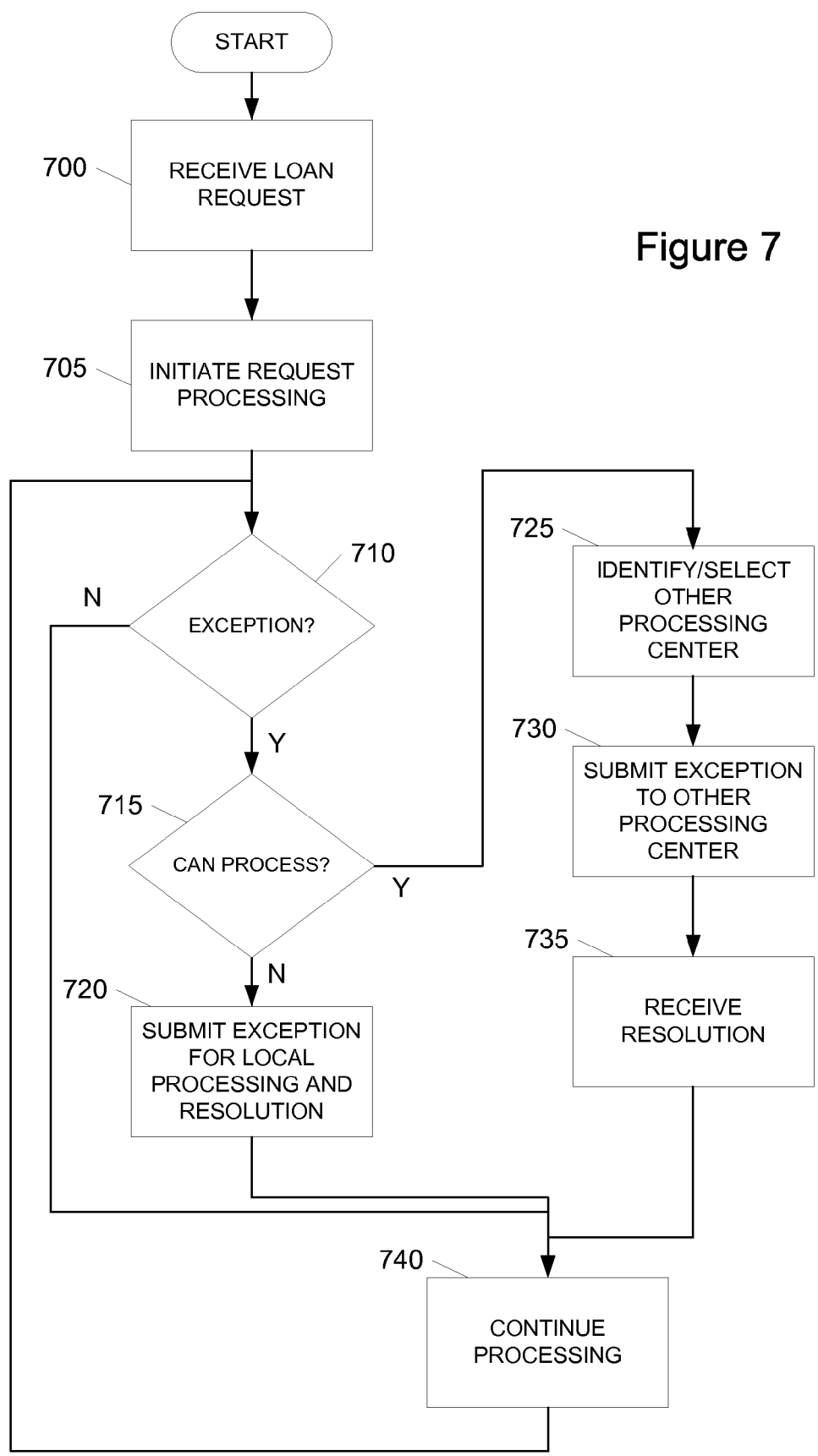
FIG. 7 is a flowchart illustrating a method for processing exceptions in a distributed processing network according to one or more aspects described herein.

FIG. 7 is a flowchart illustrating a method for processing exceptions in a distributed loan processing network. In step 700, a loan processing center may receive a loan request. The loan request may be received electronically by an automated loan processing system or manually by loan processing personnel at the center. In step 705, processing of the loan request may be initiated. For example, a loan request may be initially processed by extracting data provided in the request and obtaining supplemental loan data from one or more sources. In step 710, a determination may be made as to whether an exception has been detected. An exception may be defined by a lending or institution policy. An exception may also be triggered if the current processing center, or personnel or systems thereof, are unable to perform a certain task. For example, if the center's personnel do not have the requisite skills or knowledge to perform due diligence, an exception may be generated. If an exception is detected, a further determination is made as to whether the exception may be processed locally in step 715. For example, if manual approval is needed for a loan request exceeding a certain amount, the manual approval may be obtained from a credit risk partner associated with the processing center. If the processing center is able to resolve the exception locally, the exception may be submitted for processing and resolution in step 720. Once the exception has been resolved, loan request processing may continue in step 740 until processing of the loan request is completed. Completion of processing may include the boarding and execution of a loan, a transfer of funds to an applicant and/or the transmission of a confirmation message to the applicant.

If, however, the exception is not able to be processed locally by the processing center, the processing center may identify and select one or more other processing centers that are able to resolve the exception in step 725. As discussed, other processing centers may be selected based on a variety of factors including center capabilities and load. Upon selecting one or more other processing centers, the original processing center may submit the exception to the one or more other processing centers in step 730. The submission may include information such as a processing status, nature of the exception and/or a time at which resolution is due or needed. In step 740, in response to the submission to the one or more other processing centers, the original processing center may receive a resolution in step 735 from the one or more other processing centers. For example, the resolution may include information that was unobtainable by the original processing center or a loan request approval that required manual review. Once received, the loan request processing may continue in step 740 until processing of the loan request is completed.

Additionally or alternatively, during the processing of the loan request, the processing center may log real-time processing information such as processing status, cycle time, productivity, loan volume, touch time, accuracy, production resources—full-time-equivalent (FTE) availability. This information may be reported to a management team or a monitoring team on a regular basis or if a certain aspect of the processing is outside of an acceptable boundary. For example, is a loan volume is abnormally high for a processing center or system, a management team may be alerted to the situation. Further, real-time processing status information may be provided to an applicant.

In one or more configurations, multiple exceptions may be submitted to one or more other processing centers at the same time. That is, the original processing center may request that a first processing center obtain supplemental loan request data while a second processing center validates the completeness of the data provided in the loan request. Such a method and system may further reduce processing time of loan requests.

Figure 8:
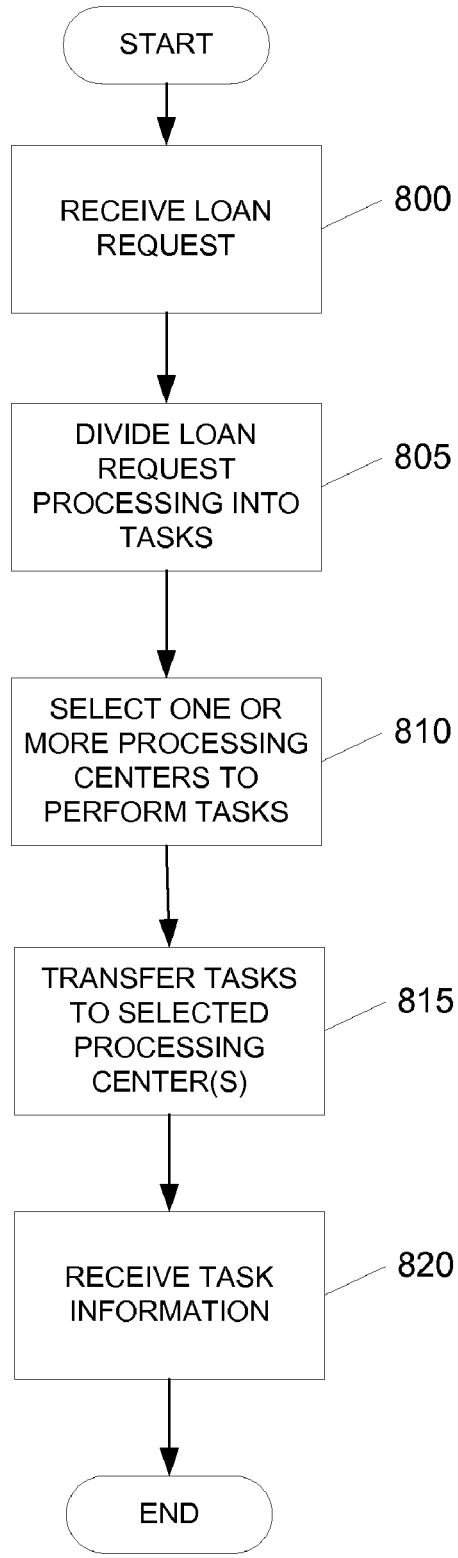
FIG. 8 is a flowchart illustrating a method for processing a loan request using a master processing system in a distributed processing network according to one or more aspects described herein.

FIG. 8 is a flowchart illustrating a method for processing loans using a master processing system. A master processing system may be a central processing system located at a master processing center or may comprise a processing system of a processing center at which a loan request was initially received. In step 800, the master processing system may receive a loan request. The loan request may be received from an applicant directly or via another processing center or system. In step 805, the master processing system may divide the processing of the loan request into multiple tasks. The number of tasks in which the processing is divided may be determined based on a variety of factors including a number of available processing centers, processing load and complexity of the request. In step 810, the processing system may, for each task, select a processing center to handle the task. In one or more instances, a processing center may be selected based on personnel having particular skills or knowledge located at the processing center. In step 815, the tasks may be transmitted to the selected processing center according to a processing sequence. Upon completion of each task, the master processing system may receive confirmation of completion and/or task information in step 820. For example, a processing center for performing due diligence may respond with confirmation that due diligence was performed in addition to obtained due diligence information. In another example, an exception detected by a first processing center may be sent as a task to a second processing center for resolution based on the personnel available at the second processing center.

Figure 9:
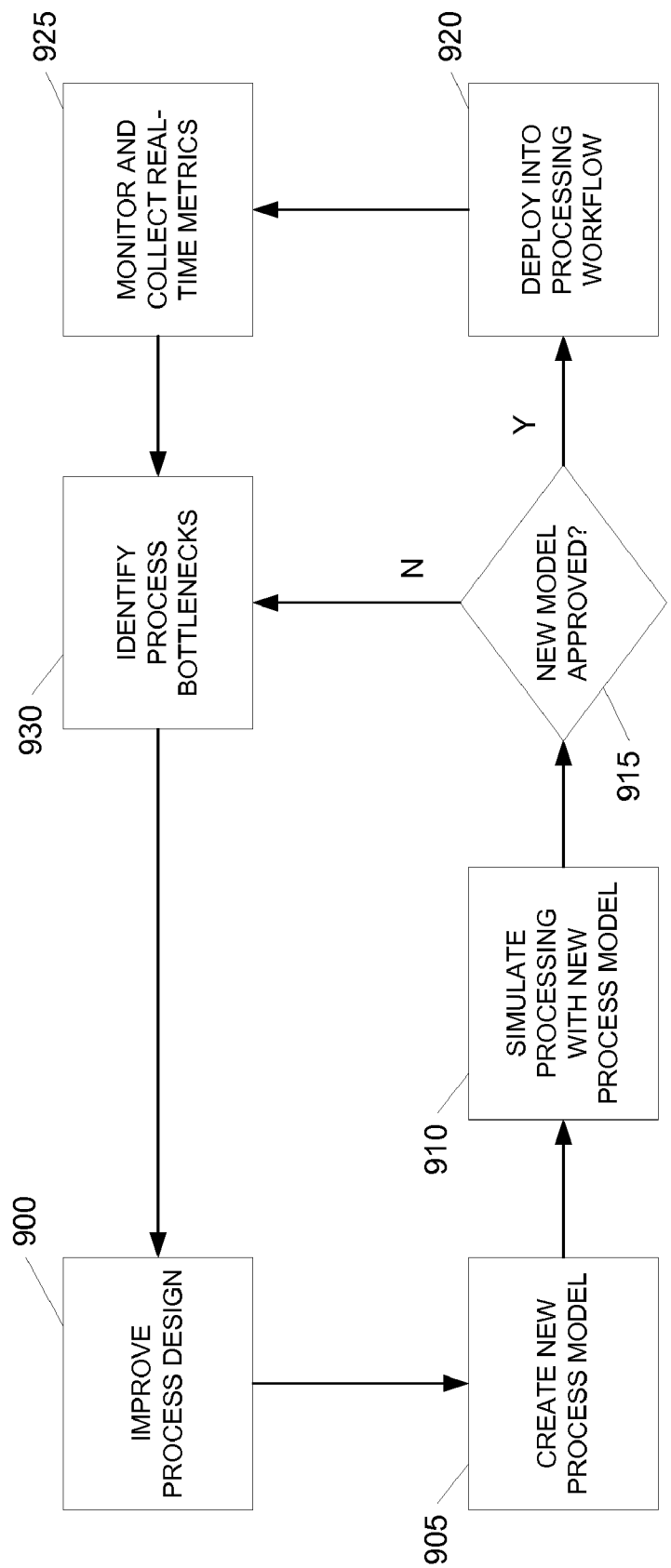
FIG. 9 is a flowchart illustrating a method for testing, validating and deploying new processes and process models in a loan processing system according to one or more aspects described herein.

FIG. 9 illustrates a method for testing, validating and deploying a new loan processing model or design. In steps 900 and 905, a new process model may be developed for improving the design of a current loan processing process. A process model, as described herein, generally relates to a collection of rules, requirements, policies and/or capabilities for performing a certain task (e.g., loan request processing). A new process model may include new processing tasks, new or modified workflow rules, modifications to existing characteristics of the loan processing workflow and the like. In one example, the order in which loan processing tasks are performed may be altered to increase processing efficiency. In another example, new exception rules may be developed to redefine where certain exceptions are sent for resolution (e.g., a different group of loan processing personnel). The ability to process new types of loans may also be added by implementing new or modified process models. Once a model has been developed, the model may be implemented in a simulation environment of a loan processing system in step 910. That is, the simulation environment may simulate loan processing using the newly developed loan processing model including any new processing tasks, new or modified workflow rules and/or other modifications. The simulation environment may operate independently of and/or simultaneously with a live loan processing environment. As such, while a loan request is being processed by a current process model, the same or a different loan request may also be processed using a new process model in the simulation environment.

In step 915, a decision may be made as to whether the process model is approved. Approval may be determined based on a manual determination or an automatic evaluation of the results of the simulation. For example, approval may be determined automatically based on whether the processing time meets a threshold processing time. In one arrangement, the threshold processing time may be predefined as a current average processing time associated with the current process model or a predicted or expected processing time. Thus, if a processing time required for a new process model is slower or greater than the average, predicted and/or expected processing time of the current process model, the new process model might not be approved. One of ordinary skill in the art will appreciate that the threshold may be defined in a variety of ways and based on a variety of factors. Multiple simulations using different sets of data may be performed to validate results and metrics generated using the new process model.

If the new process model is approved, the new process model may be deployed into the processing system for live use in step 920. For example, if the new process model includes additional processing steps or tasks, the steps or tasks may be added into the loan processing. The deployment may be performed in a dynamic manner such that reprogramming or recoding might not be necessary. That is, a rules or workflow engine (e.g., engine 225 of FIG. 2) may be directed to alter or modify a loan request processing workflow in accordance with the applied model without having to modify or alter the underlying code of the workflow or rules engine. In one example, a new process model may be loaded from a simulation environment of a processing system to a live processing portion of the system as a set of predefined rules and instructions that are executed and enforced by a rules engine when processing loan requests. Alternatively or additionally, deployment may be performed such that the new process model is implemented into the processing workflow during runtime.

After the new process model has been deployed, the processing system may monitor and collect various metrics in step 925. These metrics may include delays between processing steps, a total processing time, a number of requests processed in a predefined period of time and the like. In step 930, the metrics may be used to identify process bottlenecks so that further improvements may be made in step 900. For example, if a delay is consistently identified between a first task and a second task, the process model may be revised to improve the processing time between the first task and the second task. As such, process models may be continuously evaluated to identify potential areas for improvement. The identification of bottlenecks is discussed in further detail below.

If, on the other hand, the new process model is not approved, the processing system may proceed to step 930 where bottlenecks in the new process model are identified. By identifying the bottlenecks, the new process model may be further refined to meet the standards of approval. Bottlenecks may be identified in step 930 either manually or automatically. That is, the data collected from a new process model may be reviewed by loan processing personnel or evaluated automatically by the processing system based on predefined bottleneck definitions and rules. In one example, a bottleneck may be defined as any area where the delay exceeds a threshold delay. Accordingly, a processing system may compare processing times and delays for one or more task with the threshold delay to determine whether a bottleneck exists at a particular task or between two or more tasks. A variety of other rules and definitions may be used for identifying bottlenecks.

Accordingly, using the methods and systems for testing, validating and deploying new process models, loan request processing may be continuously refined based on real-time results and data generated from either simulations or live processing. In addition, the deployment and testing process may be streamlined such that live processing of loan requests are minimally, if at all, disrupted.

The methods and systems described herein may be applied to a variety of types of loans, including mortgages, personal loans, auto loans, business loans and the like. For example, a customer may apply for a loan on behalf of a business. The application may be transmitted to a processing center where approval and fulfillment may be processed. If processing has not completed at the time of closing of the processing center, the loan request may be transmitted to another processing center to complete processing. A distributed processing system may provide a loan request answer and, if approved, complete the loan in a shorter amount of time. In addition, distributed processing may be used on occasions where a processing system may be overloaded. In particular, the loan request processing load may be distributed across additional processing system to balance the load.

Additionally, the methods and features recited herein may further be implemented through any number of computer readable mediums that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects of the present invention as shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for processing loans, the method comprising:
   receiving, at a loan processing system of a first processing center, a loan request including loan request information;
   transmitting, from the first processing center, the loan request to a second processing center, wherein the second processing center is associated with a time zone different than that of the processing center and wherein the first and second processing centers are associated with a loan processing institution;
   determining a first amount of available processing time at the second processing center;
   determining a second amount of available processing time at a third processing center;
   comparing the first amount of available processing time to the second amount of available processing time;
   selecting the second processing center in response to determining that the first amount of available processing time is greater than the second amount of available processing time to maximize processing time by as few processing centers as possible;
   receiving, at the loan processing system, supplemental loan request information based on the loan request information;
   calculating, by the loan processing system, a risk score for the loan request based on the loan request information and the supplemental loan request information in response to receiving the loan request information and the supplemental loan request information;
   upon receiving the supplemental loan request information, determining, by the loan processing system, whether the loan request is approved by comparing the risk score with a predefined risk score threshold; and
   in response to determining that the loan request is approved, approving the loan request.

2. The method of claim 1, further comprising the step of boarding a loan corresponding to the loan request in response to determining that the loan request is approved.

3. The method of claim 1, wherein the supplemental loan request information is received from a selected processing center different from the first processing center.

4. The method of claim 3, further comprising the steps of:
   selecting the selected processing center from a plurality of other processing centers based on at least one of capability information and load information associated with the selected processing center; and
   requesting the supplemental loan request information from the selected processing center.

5. The method of claim 1, wherein the step of transmitting is performed in response to detecting a loan processing exception.

6. The method of claim 1, wherein the supplemental loan information includes at least one of: a credit score and a credit history.

7. The method of claim 1, further comprising:
   detecting a loan processing exception; and
   submitting the loan request for exception processing.

8. The method of claim 7, wherein the loan request is submitted to a first group of one or more loan processing personnel specializing in processing the loan processing exception.

9. The method of claim 8, wherein the first group of one or more loan processing personnel is formed based on one or more common skills of the one or more loan processing personnel.

10. The method of claim 8, wherein the loan processing exception is escalated to second group of one or more loan processing personnel in response to determining that the group of one or more loan processing personnel is unable to resolve the exception.

11. The method of claim 10, wherein the second group of one or more loan processing personnel has at least one of a higher skill level and a higher authority than the first group of one or more loan processing personnel.

12. The method of claim 1, further comprising automatically triggering a loan fulfillment process by the loan processing system, the loan fulfillment process including generating one or more closing documents using at least one of: the loan request information and supplementary loan request information in response to determining that the loan request is approved.

13. A method for processing loans, the method comprising:
   receiving, at a loan processing system of a first loan processing center, a loan request including loan request information;
   initiating processing of the loan request by the loan processing system, wherein the processing includes a loan approval process;
   detecting a predefined event by the loan processing system; and
   in response to detecting the predefined event:
      determining, by the loan processing system, a first amount of processing time available at a second loan processing center;
      selecting, by the loan processing system, the second loan processing center to continue loan processing, wherein the second loan processing center is selected from a plurality of processing centers based at least in part on an amount of available processing time at the second loan processing center to maximize processing time by as few processing centers as possible; and
      transferring at least a portion of the loan request and status information of the loan request to the selected second loan processing center to continue loan processing.

14. The method of claim 13, wherein the predefined event includes the detection of a loan processing exception.

15. The method of claim 13, wherein the predefined event corresponds to a closing time of the first processing center.

16. The method of claim 13, wherein the step of initiating, at the loan processing system, processing of the loan request includes dividing the processing of the loan request into a plurality of processing tasks.

17. The method of claim 16, wherein selecting the second loan processing center is further performed based on a capability of the second loan processing center matching a requirement of a first task of the plurality of processing tasks, wherein the at least a portion of the loan request includes the first task and wherein the method further includes:

automatically identifying and selecting a third loan processing center for processing a second task of the plurality of processing tasks based on a capability of the third loan processing center matching a requirement of the second task: and transferring the second task of the loan request to the third loan processing center.

18. The method of claim 17, wherein the loan processing system of the first processing center and the second and third loan processing centers are associated with a loan institution.

19. The method of claim 13, wherein the loan request information includes at least one of an applicant identification number and an application number and wherein at least one of the loan processing system of the first processing center and the second processing center determines supplemental loan request information based on the at least one of the application identification number and the application number.

20. The method of claim 13, wherein the processing system corresponds to a first time zone and the selected second processing center corresponds to a second time zone different from the first time zone.

21. The method of claim 13, wherein transferring the loan request to the selected second processing center to continue loan processing includes transmitting a loan processing status indicating a current stage at which the loan request is being processed.

22. The method of claim 13, wherein the loan processing system comprises a master loan processing system that manages loan processing across a plurality of loan processing centers.

23. A non-transitory computer readable medium storing computer executable instructions that, when executed by a processor, causes a processor to perform a method comprising:

receiving, at a loan processing system of a first processing center, a loan request;

initiating processing of the loan request, wherein the processing includes a loan approval process and a loan fulfillment process;

detecting a predefined event:

in response to detecting the predefined event:

determining a first amount of processing time available at a second loan processing center:

selecting, by the loan processing system, a second loan processing center to continue loan processing based on the determined first amount of processing time, wherein the second loan processing center is selected from a plurality of processing centers based at least in part on an amount of available processing time at the second loan processing center to maximize processing time by as few processing centers as possible; and transferring at least a portion of the loan request to the first second loan processing center.

24. The computer readable medium of claim 23, wherein selecting the second loan processing system is further performed based on a capability of the second loan processing center matching a requirement of a first task of a plurality of processing tasks of the automated processing of the loan, wherein the at least a portion of the loan request includes the first task and wherein the method further includes:

automatically identifying and selecting a third loan processing center for processing a second task of the plurality of processing tasks based on a capability of the third loan processing center matching a requirement of the second task; and transferring the second task of the loan request to the third loan processing center.

25. The computer readable medium of claim 24, wherein transferring the second task to the third processing center includes transferring a processing status of the loan request to the second processing center.

26. The computer readable medium of claim 24, wherein the second processing center is in a first time zone and the third processing center is in a second time zone.

\* \* \* \* \*